(12) United States Patent
Yu

(10) Patent No.: US 10,067,746 B1
(45) Date of Patent: Sep. 4, 2018

(54) APPROXIMATE RANDOM NUMBER GENERATOR BY EMPIRICAL CUMULATIVE DISTRIBUTION FUNCTION

(71) Applicant: Futurewei Technologies, Inc., Plano, TX (US)

(72) Inventor: Jiangsheng Yu, San Jose, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

(21) Appl. No.: 15/448,233

(22) Filed: Mar. 2, 2017

(51) Int. Cl.
*G06F 1/02* (2006.01)
*G06F 7/58* (2006.01)
*G06F 17/18* (2006.01)

(52) U.S. Cl.
CPC .............. *G06F 7/588* (2013.01); *G06F 17/18* (2013.01)

(58) Field of Classification Search
CPC ................................. G06F 7/588; G06F 17/18
USPC .................................................. 708/250–256
See application file for complete search history.

(56) References Cited

U.S. PATENT DOCUMENTS

2003/0182293 A1* 9/2003 Chambers ............... G06F 17/18
2008/0114564 A1* 5/2008 Ihara ................. G06F 17/30321
702/158
2011/0191129 A1 8/2011 Moriya
2014/0114609 A1* 4/2014 Maurer .............. H03H 21/0016
702/179
2017/0046392 A1 2/2017 Lilienthal
2017/0371936 A1* 12/2017 Yu .................... G06F 17/30554

FOREIGN PATENT DOCUMENTS

CN 103644908 A 3/2014

OTHER PUBLICATIONS

ISR, PCT/CN2018/076977, dated May 3, 2018, 8 pages.

* cited by examiner

*Primary Examiner* — Tan V. Mai
(74) *Attorney, Agent, or Firm* — Vierra Magen Marcus LLP

(57) ABSTRACT

The disclosure relates to technology for generating random numbers that are distributed by the population distribution. An empirical cumulative distribution function is constructed from random samples of the population, and a first random number is generated that is uniformly distributed over a first interval. A second interval in the empirical cumulative distribution function is found such that a range of values of the second interval cover the first random number. A second random number is then generated as an approximation to the random number drawn from the population, where the second random number is employed as part of a testing process.

20 Claims, 8 Drawing Sheets

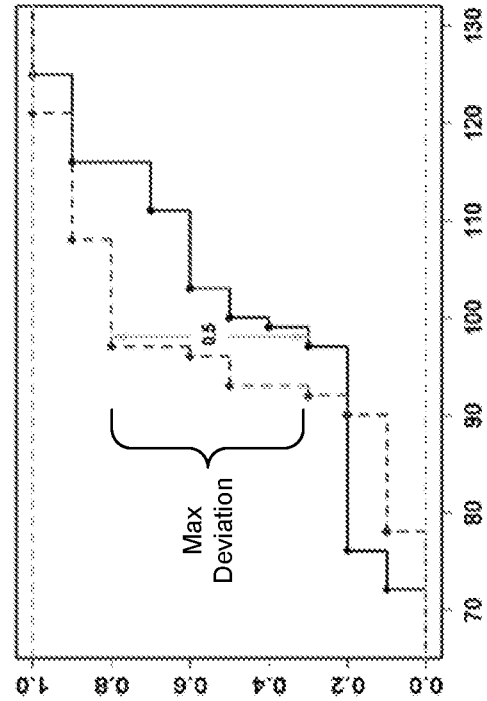
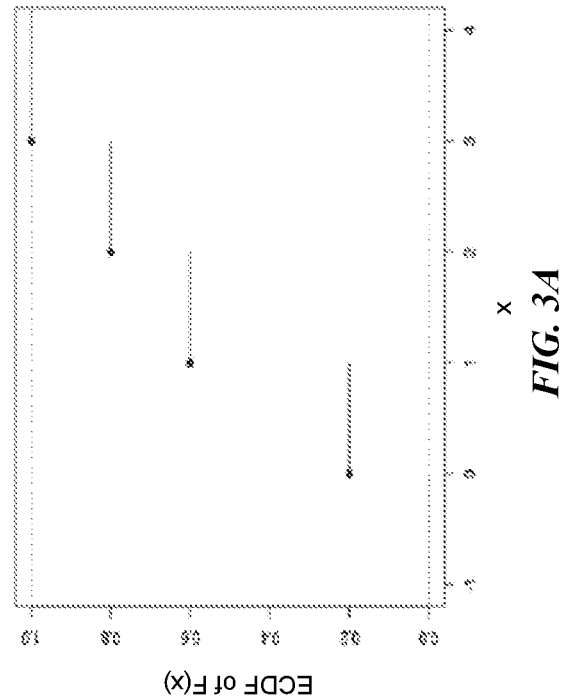
*FIG. 3A*
*FIG. 3B*

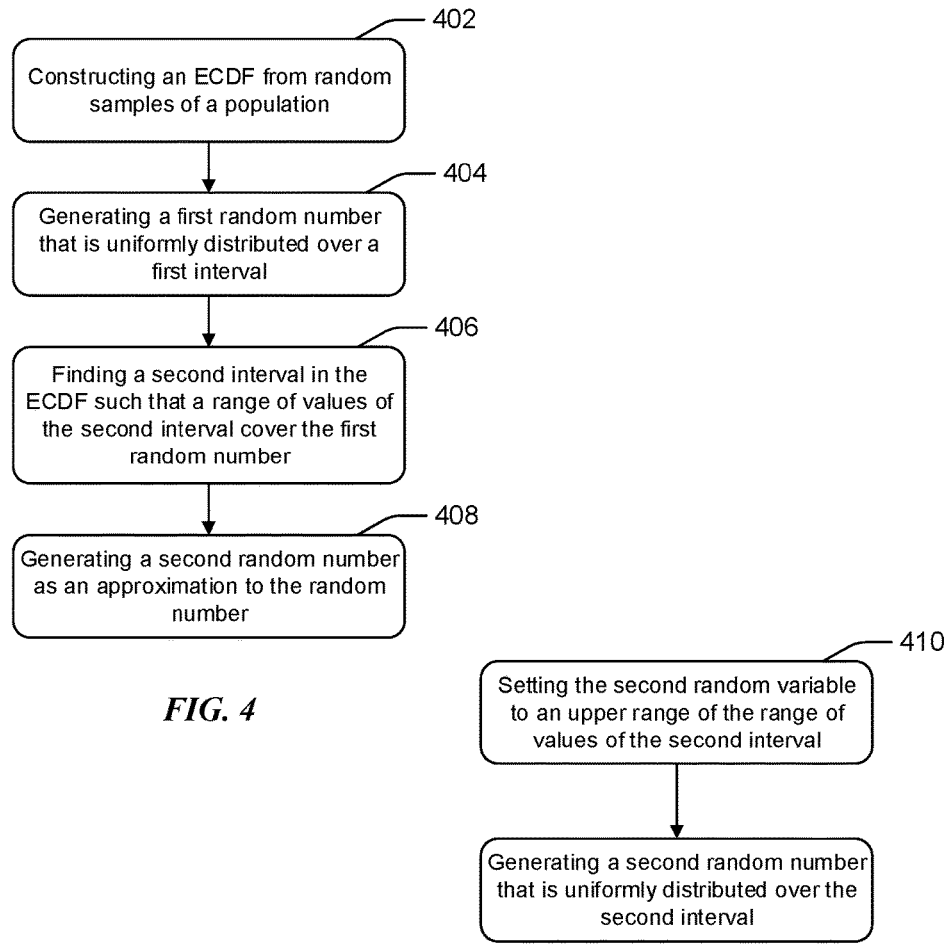
FIG. 4
FIG. 4A
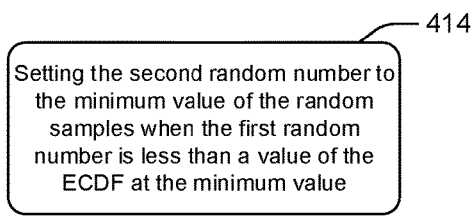
FIG. 4B
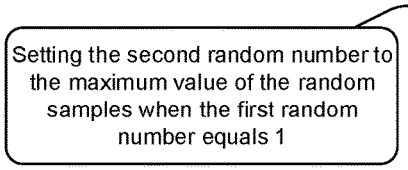
FIG. 4C

APPROXIMATE RANDOM NUMBER GENERATOR BY EMPIRICAL CUMULATIVE DISTRIBUTION FUNCTION

BACKGROUND

Data incorporating large quantities of variables is becoming increasingly commonplace, especially in data sets that are sufficiently large that they may be generated and/or stored by multiple computing devices. In addition to the challenges of handling such a large quantity of data, increasing the quantity of variables in a data set by even a small degree tends to add exponentially to at least the complexity of relationships among the data values, and may result in an exponential increase in data size.

Among such challenging data sets are large random samples generated by various forms of statistical analysis. Performance testing is essential for quality assurance of products and services across all industries. A reliable performance testing depends largely on proper testing data, which is not always accessible for testing purposes. Accordingly, developers and manufacturers are challenged with providing testing data for testing products and services where such testing data may not be obtainable. As a result, precision of the testing results is often inaccurate or misleading since the performance testing data was not available.

BRIEF SUMMARY

In a first embodiment, there is a computer-implemented method for generating random numbers that are distributed by a population distribution, comprising constructing an empirical cumulative distribution function from random samples of the population; generating a first random number that is uniformly distributed over a first interval; finding a second interval in the empirical cumulative distribution function such that a range of values of the second interval cover the first random number; and generating a second random number as an approximation to the random number drawn from the population, wherein the second random number is employed as part of a testing process.

In a second embodiment according to the first embodiment, the generating the second random number comprises setting the second random number to an upper range of the range of values of the second interval when the random variable is discrete; and generating a second random number that is uniformly distributed over the second interval when the random variable is continuous.

In a third embodiment according to any of the first through second embodiments, the first random number is less than 1 and greater than or equal to the value of empirical cumulative distribution function at the minimum value of the random samples.

In a fourth embodiment according to any of the first through third embodiments, the generating the second random number comprises setting the second random number to the minimum value of the random samples when the first random number is less than the value of empirical cumulative distribution function at the minimum value of the random samples.

In a fifth embodiment according to any of the first through fourth embodiments, the generating the second random number comprises setting the second random number to the maximum value of the random samples when the first random number is equal to 1.

In a sixth embodiment according to any of the first through fifth embodiments, further comprising collecting the random samples of the population.

In a seventh embodiment according to any of the first through sixth embodiments, a plurality of second random numbers are generated by one or more processors in parallel.

In an eight embodiment, there is a device for generating random numbers that are distributed by a population distribution, comprising a non-transitory memory storage comprising instructions; and one or more processors in communication with the memory, wherein the one or more processors execute the instructions to perform operations comprising constructing an empirical cumulative distribution function from random samples of the population; generating a first random number that is uniformly distributed over a first interval; finding a second interval in the empirical cumulative distribution function such that a range of values of the second interval cover the first random number; and generating a second random number as an approximation to the random number drawn from the population, wherein the second random number is employed as part of a testing process.

In a ninth embodiment, there is a non-transitory computer-readable medium storing computer instructions for generating random numbers that are distributed by a population distribution, that when executed by one or more processors, perform the steps of constructing an empirical cumulative distribution function from random samples of the population; generating a first random number that is uniformly distributed over a first interval; finding a second interval in the empirical cumulative distribution function such that a range of values of the second interval cover the first random number; and generating a second random number as an approximation to the random number drawn from the population, wherein the second random number is employed as part of a testing process.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

FIG. 3A illustrates an empirical cumulative distribution function according to one example embodiment.

FIG. 3B illustrates a Kolmogorov distance between two distribution functions as calculated in FIG. 3A.

FIGS. 4 and 4A-4C illustrate flow diagrams in accordance the FIGS. 1-3.

DETAILED DESCRIPTION

The disclosure relates to technology for generating random numbers that are distributed by a population distribution.

In statistics, traditional resampling methods such as bootstrapping or jackknifing, allow for the estimation of the precision of sample statistics (e.g., medians, variances, percentiles) using subsets of data or by drawing randomly with replacement from a set of data points. In such instances, no new sample points are generated. That is, only data points from otherwise available data may be sampled. Thus, data that is unavailable may not be used as part of the resampling methodology.

According to embodiments of the disclosure, the proposed methodology provides for the generation of random numbers that are characteristic of data points (samples) in the data that would otherwise not be available for consumption. That is, new random numbers may be generated that are not part of the set of observations. For example, assume a set of data that includes private or sensitive information for which a small portion of the data is available (e.g., names and addresses), but for which other portions of the data (e.g., medical history and social security number) remain unavailable. In one embodiment, the random number characteristic of the unavailable data points is created by constructing an empirical cumulative distribution function from random samples of the data (or a population). A random number distributed over a first interval is generated, a second interval in the empirical cumulative distribution function is found such that a range of values of the second interval cover the first random, number, and a second random number is generated as an approximation to the first random number from the population.

It is understood that the present embodiments of the invention may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the invention is intended to cover alternatives, modifications and equivalents of these embodiments, which are included within the scope and spirit of the invention as defined by the appended claims. Furthermore, in the following detailed description of the present embodiments of the invention, numerous specific details are set forth in order to provide a thorough understanding. However, it will be clear to those of ordinary skill in the art that the present embodiments of the invention may be practiced without such specific details.

Figure 1:
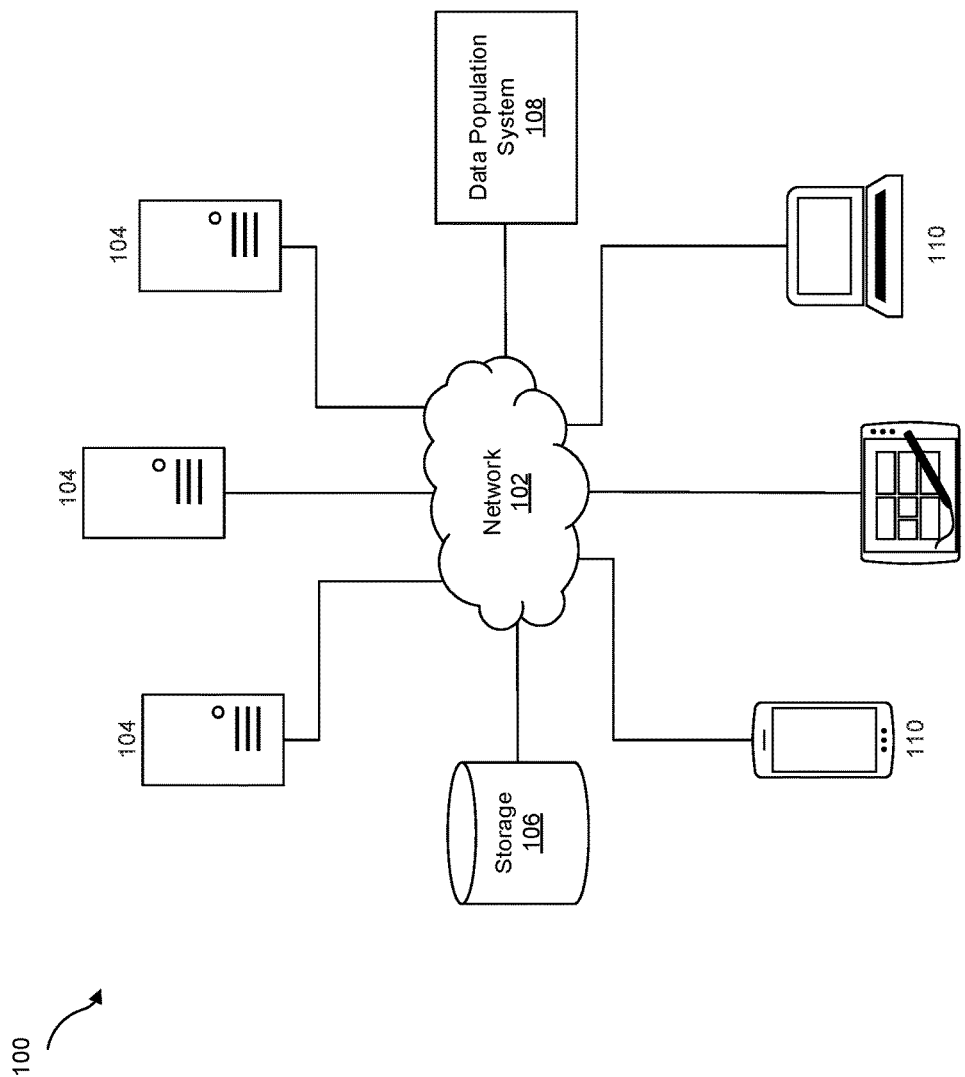
FIG. 1 illustrates an example of a distributed data processing system in which embodiments of the disclosure may be implemented.

FIG. 1 illustrates an example of a distributed data processing system in which embodiments of the disclosure may be implemented. Distributed data processing system 100 includes, but is not limited to, a network 102, servers 104, storage 106, data population system 108 and client devices 110.

The network 102 represents one or more of a cable, wireless, fiber optic, or remote connections via a telecommunication link, an infrared link, a radio frequency link, or any other connectors or systems that provide electronic communication. The network 102 may include an intranet, the Internet or any combination, and also include intermediate proxies, routers, switches, load balancers, and the like.

In the depicted example, a server 104 is connected to network 102 along with storage 106 and clients 110. In one embodiment, the server 104 provides data, such as boot files, operating system images, and applications to clients 110. Servers 106 may include any computing devices configured to respond to network requests received from client devices 110, and may include a web server, an application server, a file server, or a database server or the like.

Clients 110 may include, for example, a notebook computer, a desktop computer, a laptop computer, a handheld computing device, a mobile phone or a smartphone, a tablet computing device, a portable reading device, or any other processing device.

Data population system 108 is operable to generate sampling data, for example, based on provisioned data generating rules at the client 110, and is described in more detail below.

Storage 106 represents any device or combination of devices configured to store data for use by data population system 108. Such data may include database information, data schema, the data generating rules, data patterns and trends, and historical sampling data.

It is appreciated that the processes and methodologies described herein may be implemented in a client device or a server. For example, the processes described herein may be implemented in a server, such as server 104, that obtain data from various data sources connected via the network 102. In response to a request from a client device, such as client device 110, the server 104 collect the data for evaluation using the techniques described below.

Figure 2:
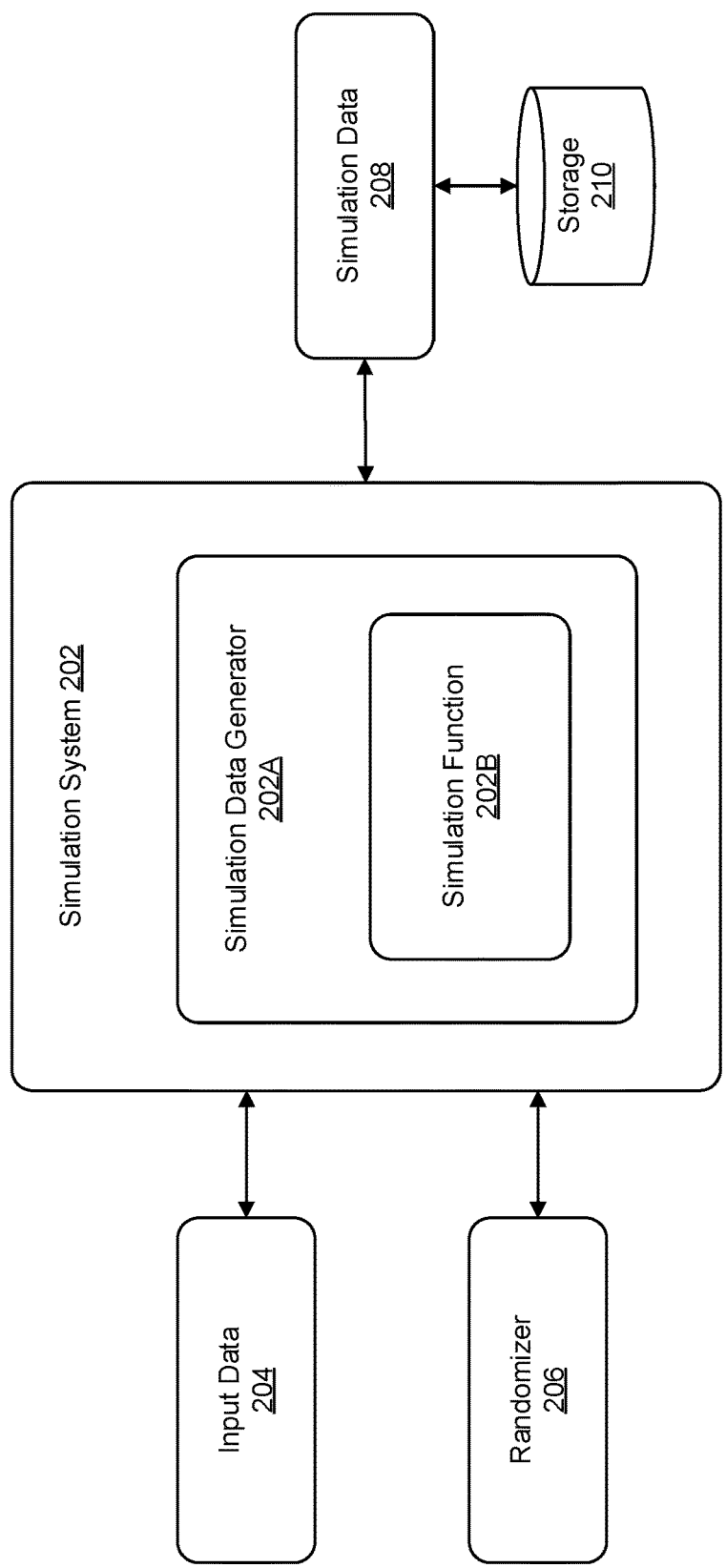
FIG. 2 illustrates an example simulation system implemented in the distributed data processing system of FIG. 1.

FIG. 2 illustrates an example simulation system implemented in the distributed data processing system of FIG. 1. The simulation system 202 may generate an approximate probability distribution for a statistical test, where the statistical test generates results of the statistical test using the approximate probability distribution. Simulations may be performed for any number of statistic tests. For example, statistical tests may include a median test, a Kolmogorov Smirnov test, a Friedman test, data mining decision tree tests, or the like. However, it is appreciated that any number of different statistical tests may be employed as well understood by the skilled artisan.

The simulation system 202 may be arranged to generate a cumulative distribution function (CDF) (or distribution function) for the statistics of a simulation test. A probability distribution may assign a probability to each measurable subset of possible outcomes of a random experiment of statistic inference and may be univariate or multivariate. A univariate distribution gives the probabilities of a single random variable taking on various alternative values, whereas a multivariate distribution gives probabilities of a random vector (e.g., a set of two or more random variables) taking on various combinations of values.

In particular, a statistical test is a hypothesis that is testable on the basis of observing a process that is modeled via a set of random variables. Typically, two statistical data sets are compared or a data set obtained by sampling is compared against a synthetic data set from an idealized model. A hypothesis is then proposed for the statistical relationship between the two data sets, and this is compared as an alternative to an idealized null hypothesis that proposes no relationship between two data sets. The comparison is deemed statistically significant if the relationship between the data sets would be an unlikely realization of the null hypothesis according to a threshold probability—the significance level.

In statistical testing, a test statistic is a function of associated data and a model. Under the assumptions of a null hypothesis and the model the test statistic has an associated "sampling distribution." A sampling distribution refers to a probability distribution for values of the test statistic over hypothetical repeated random samples of the data, for random data samples having the probability distribution assumed for the data by the model and null hypothesis.

In different embodiments, a probability distribution may be "known" or "unknown." A probability distribution of "known" refers to the analytical formula of the CDF of the distribution can be efficiently computed, for example, the CDF is a closed-form expression, or the CDF can be well approximated in a numerical method. On the other hand, a probability distribution of "unknown" refers to the analytical formula of the CDF of the distribution is unavailable, or cannot be efficiently computed or approximated by any known numerical method. Accordingly, the probability distribution of "unknown" is to be evaluated through simulation, as in the examples described herein.

In one embodiment, the statistics of simulation tests follow a probability distribution of the above-mentioned unknown form. In such cases, a probability distribution of unknown form may be approximated through empirical measure. An empirical measure is a random measure arising from a particular realization of a sequence of random variables that are typically finite. As such, the simulation system 202 may generate an approximate probability distribution for the statistics of a simulation test where the probability distribution for the statistics of the simulation test is unknown. Examples of an approximate probability distribution may include, but are not limited to, an empirical distribution function (or empirical CDF), which is an empirical CDF is a cumulative distribution function associated with an empirical measure of a statistic.

The simulation system 202 may be part of the data population system 108 (FIG. 1). As illustrated in the non-limiting embodiment, the simulation system 202 includes a simulation data generator 202A and simulation function 202B. The simulation system 202 is also communicatively coupled to input data 204, randomizer 206 and simulation data 208, which is communicatively coupled to storage 210.

The simulation data generator 202A may generate simulation data 208 for a simulation test using the simulation function 202B. The simulation function 202B, which may be stored as part of a software library, may be any well-known distribution model, such as the empirical CDF.

The input data 204 may comprise definitions to generate simulation data 208, and the randomizer 206 may generate random numbers for deriving the simulation data 208. The input data 204 may also include data generation parameters, such as statistical information including minimum, maximum, mean, variance, number of distinct values, etc., useful for the simulation system 202 to produce simulation data 208. For example, the input data 204 may provide information about a computing environment in which the simulation system 202 will run, a database to store the simulation data 208, data structures for the simulation data 208 and other information related to generating simulation data 208.

In one embodiment, the simulation data generator 202A may utilize the simulation function 202B, the input data 204 and/or the randomizer 206 to generate the simulation data 208. The simulation data generator 202A may also store the simulation data 208 in a storage 210. For example, the simulation data 208 may be stored in the storage 210 in accordance with definitions provided by the input data 204.

Storage 210 may be any storage, storage system, data source, database, or the like.

FIG. 3A illustrates an empirical cumulative distribution function according to one example embodiment. FIG. 3B illustrates a Kolmogorov distance between two distribution functions as calculated in FIG. 3A.

In probability distribution, the probability of an occurrence of different possible outcomes is predicted. Probability distributions are generally divided into two classes—discrete probability distribution and continuous probability distribution. Algorithms, many of which are based on a pseudorandom number generator that produces numbers X, are uniformly distributed in an interval [0,1]. These random variables X are then transformed via an algorithm to create a new random variable, as described below, having the required probability distribution.

In one embodiment, an empirical cumulative distribution function (ECDF) is constructed from random samples of a population. Given a sequence of samples $X_1, X_2, \ldots X_n \sim F(x)$, where the distribution function $F(x)$ is unknown, the empirical cumulative distribution function of the samples may be used to generate a random number (i.e., a new random number) from $F(x)$. In one embodiment, the newly generate random number is characteristic of data in the population that is otherwise not available for sampling. The empirical cumulative distribution function is defined by the following non-decreasing step function over $\mathbb{R}$ with values in the interval [0,1]:

$$\hat{F}_n(x) = \frac{1}{n} \#\{X_i \le x : x \in \mathbb{R}, i = 1, 2, \ldots, n\},$$

where $\#\{X_i \le x: I=1, 2, \ldots n\}$ denotes the number $X_i$'s that are no bigger than x, and $\mathbb{R}$ is the set of all real numbers.

The random variables may be a continuous random variable, in which the variable may take on infinitely many values, or a discrete random variable, in which the variable may only take on specified values. Taking simplistic examples for purposes of discussion, if X is uniformly distributed over the interval [0,1], then the distribution function of X is given by:

$$F(x) = \begin{cases} 0 : x < 0 \\ x : 0 \le x < 1 \\ 1 : x > 1 \end{cases}$$

If X takes on discrete values 0 and 1, with equal probability, then the distribution function of X is given by:

$$F(x) = \begin{cases} 0 : x < 0 \\ 1/2 : 0 \le x < 1 \\ 1 : x > 1 \end{cases}$$

In order to evaluate the performance of random numbers generated by the empirical distribution function, the Kolmogorov distance (K-distance) is applied to quantify a distance between two distribution functions—e.g., $F(x)$ and $G(x)$. For example, with reference to FIG. 3B, $F(x)$ is represented by the solid line and $G(x)$ is represented by the dashed line.

The K-distance between the two distribution functions F(x) and G(x) is the maximum vertical deviation (max deviation) between them, such that:

$$\sum_{x \in R} |F(x) - G(x)|$$

Applying a random sequence of samples 0, 3, 2, 1, 1 from a population, the empirical distribution function of the five samples is $$\hat{F}_5(x) \begin{cases} 0 & \text{when } x < 0 \\ 0.2 & \text{when } 0 \leq x < 1 \\ 0.6 & \text{when } 1 \leq x < 2 \\ 0.8 & \text{when } 2 \leq x < 3 \\ 1 & \text{when } x \geq 3 \end{cases}$$

where the probability distribution function describes the likelihood that a variable x that has a uniform chance to take on any value in the interval [0,1] without any chance of having another value. The probability distribution function is illustrated with reference to FIGS. 3A and 3B.

For example, when the ECDF of F(x) is plotted against samples x over the interval x<0, the ECDF of F(x)=0; over the interval 0≤x<1, the ECDF of F(x)=0.2; over the interval 1≤x<2, the ECDF of F(x)=0.6; over the interval 2≤x<3, the ECDF of F(x)=0.8; and the interval x≥3, the ECDF of F(x)=1.

If a second distribution G(x) is plotted against samples x over the same interval, the K-distance between the first distribution F(x) and second distribution G(x) is measured, resulting in the example graph of FIG. 3B is generated. The K-distance uses the maximum vertical deviation between the two curves as the maximum deviation statistic D. In this case, the maximum deviation occurs near x=100 and has D=0.5. (The fraction of F(x) that is less than one is 0.2 and the fraction of G(x) that is less than one is 0.8. Thus the maximum difference in cumulative fraction is D=0.5.).

FIGS. 4 and 4A-4C illustrate flow diagrams in accordance the FIGS. 1-3. The flow diagrams are explained with reference to FIG. 5, which illustrates an example graph of generating a random number in accordance with an embodiment of the disclosure.

It is appreciated that the processes and methodologies described herein may be implemented in a client device or a server. For example, the processes described herein may be implemented in a server, such as server 104, that obtain data from various data sources connected via the network 102. In response to a request from a client device, such as client device 110, the server 104 collects data for evaluation from a population.

At 402, the server 104 constructs an empirical cumulative distribution function ($\hat{F}_n(x)$) from random samples of the collected population. In one embodiment, $\hat{F}_n(x)$ is the empirical cumulative distribution function of n random samples from the population X~F(x). Without loss of generality (i.e., without adding any new restrictions), let $x_1 < x_2 < \ldots < x_m$ be the stepping points of the step function $\hat{F}_n(x)$. The random number X* generated by the equations below represents an approximation of a random number of F(x), where the sample size n is sufficiently large.

Figure 5:
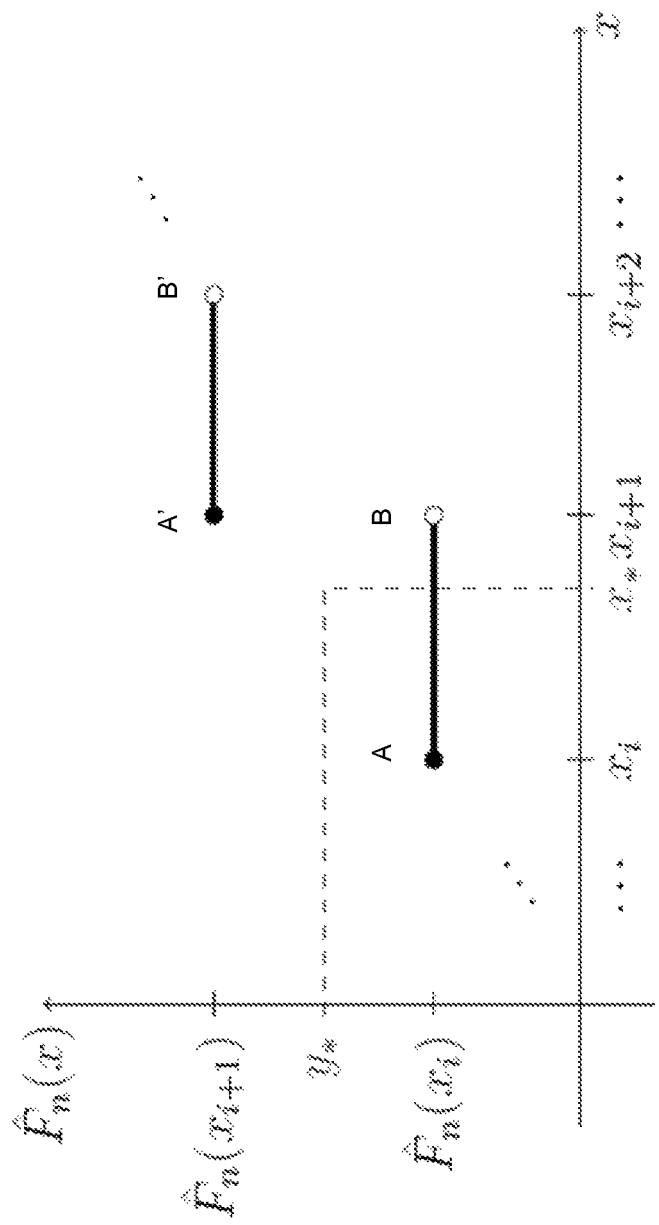
FIG. 5 illustrates an example graph of generating a random number in accordance with an embodiment of the disclosure.

Following the construction of the empirical cumulative distribution function of $\hat{F}_n(x)$ from random samples of the population at 402, a random number y* that is uniformly distributed over the interval [0,1] is generated at 404. That is, y* is generated from U[0,1], where U[0,1] denotes the uniform distribution over the interval [0,1]. In the example of FIG. 5, the interval is illustrated as a solid black line between points (A and B) and (A' and B'), where $x_i$, $x_{i+1}$ and $x_{i+2}$ represent samples of the population.

At 406, a second interval ($x_i$, $x_{i+1}$) in the empirical cumulative distribution function $\hat{F}_n(x)$ is found such that a range of values in the second interval ($x_i$, $x_{i+1}$) cover the random number y*, as depicted by the dashed lines.

At 408, a random number x* is generated as an approximation to the first ransom number y* drawn from the population. In one embodiment, the random number x* is part of a testing process in which the random number x* is not part of the original set of samples (observations).

With reference to FIG. 4A, the random number x* is determined by setting the random number x* to an upper range ($x_{i+1}$) of the range ($x_i \rightarrow x_{i+1}$) of values of the second interval ($x_i$, $x_{i+1}$) when the random number is discrete at 410, and the random number x* is generated uniformly distributed over the second interval ($x_i$, $x_{i+1}$), at 412, when the random number is continuous at 412.

For example, in one non-limiting embodiment, if $\hat{F}_n(x) \leq y^* < 1$ (i.e., the first random number is less than 1 and greater than or equal to the value of the empirical cumulative distribution function at the minimum value of the random samples), then i is searched for i∈{1, 2, ... m} such that y*∈[$\hat{F}_n(x_i)$, $\hat{F}_n(x_{i+1})$)). The random number x* is then generated uniformly over the interval [$x_i, x_{i+1}$), when X is a continuous variable. This is illustrated in FIG. 5, where for the continuous variable, when n is sufficiently large, the stepping of set function $\hat{F}_n(x)$ is sufficiently small that it is close to F(x). In this manner, the random numbers are distributed by F(x) approximately. Otherwise, when X is a discrete variable, x* is set to $x_{i+1}$.

In another embodiment, and with reference to FIG. 4B, if $y^* < \hat{F}_n(x)$ then $x^* = x_1$. In particular, when the first random number y* is less than a value of the empirical cumulative distribution function at the minimum value, the second random value x* is set to the minimum value of the random samples at 414.

In yet another embodiment, and with reference to FIG. 4C, if y*=1, then $x^* = x_m$. For example, when the first random y* number equals 1, the second random number x* is set to the maximum value of the random samples at 416.

Figure 6:
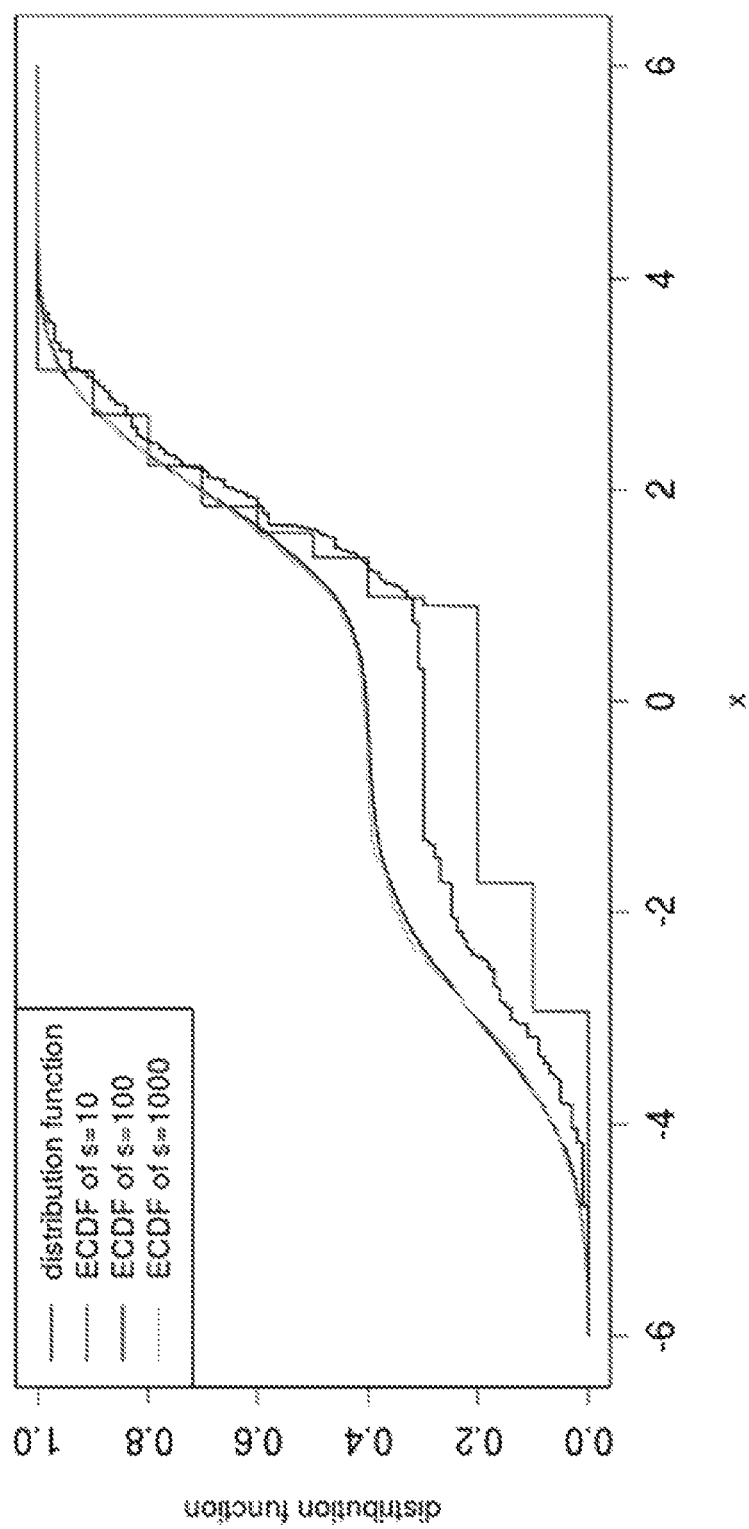
FIG. 6 illustrates an example distribution function in accordance with the disclosed technology.
Figure 7A:
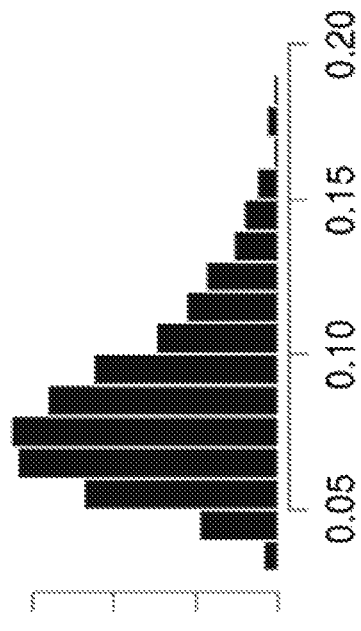
FIGS. 7A-7D illustrate an empirical distribution of the K-distance in one example embodiment.
Figure 7B:
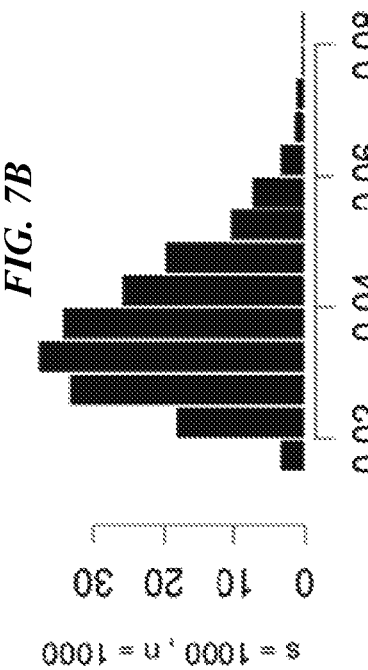
Figure 7C:
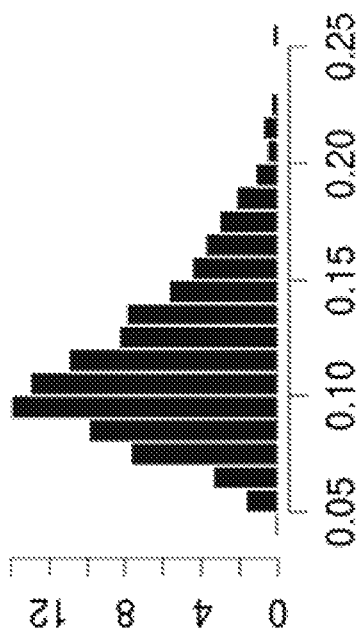
Figure 7D:
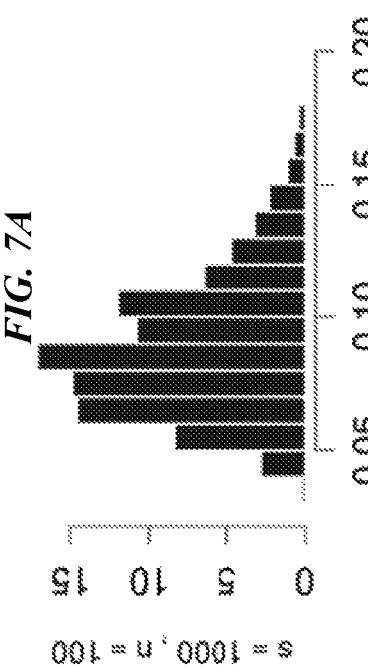

FIG. 6 illustrates an example distribution function in accordance with the disclosed technology. In the depicted example, $\hat{F}_s(x)$ is the empirical cumulative distribution function of s random samples drawn from the population of a Gaussian mixture model. The Gaussian mixture is a probabilistic model that assumes all the data points are generated from a mixture of a finite number of Gaussian distributions with unknown parameters. In this case, the Gaussian mixture is X~0.4N(−3,1)+0.6(2,0.64), where the distribution function is unknown. If s random samples (e.g., s=10, $10^2$ and $10^3$) are drawn from the population, the empirical cumulative distribution function of distinct sample sizes are illustrated against the distribution function in the figure. As depicted, the larger the sample size s, the better the results. In particular, by application of the disclosed algorithm, n random numbers are generate to construct the empirical distribution $\hat{F}_n(x)$. The K-distance between $\hat{F}_n(x)$ and F(x) is then measured to evaluate the performance of the algorithm.

In one embodiment, the random sampling is repeated independently such that the empirical distribution of the K-distance can be shown, as illustrated in FIGS. 7A-7D. As depicted, a larger s and n result in a smaller K-distance between $\hat{F}_n(x)$ and $F(x)$, where $F(x)$ is the population distribution. That is, the error of the proposed algorithm is well controlled by increasing the sample size and sampling more random numbers from the empirical cumulative distribution function.

Figure 8:
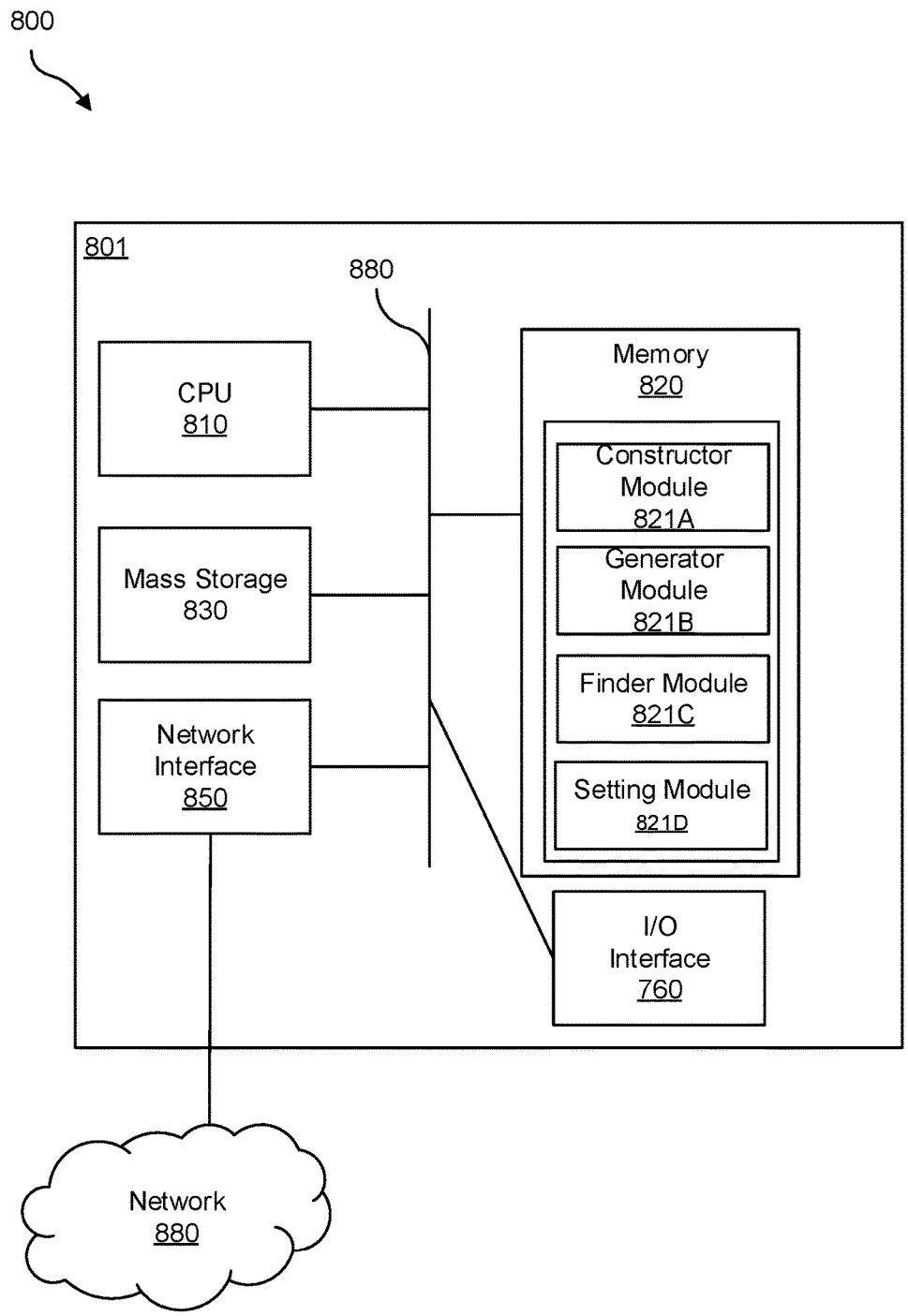
FIG. 8 illustrates a block diagram of a network system that can be used to implement various embodiments.

FIG. 8 is a block diagram of a network device 800 that can be used to implement various embodiments. Specific network devices may utilize all of the components shown, or only a subset of the components, and levels of integration may vary from device to device. Furthermore, the network device 800 may contain multiple instances of a component, such as multiple processing units, processors, memories, transmitters, receivers, etc. The network device 800 may comprise a processing unit 801 equipped with one or more input/output devices, such as network interfaces, storage interfaces, and the like. The processing unit 801 may include a central processing unit (CPU) 810, a memory 820, a mass storage device 830, and an I/O interface 860 connected to a bus 870. The bus 870 may be one or more of any type of several bus architectures including a memory bus or memory controller, a peripheral bus or the like.

The CPU 810 may comprise any type of electronic data processor. The memory 820 may comprise any type of system memory such as static random access memory (SRAM), dynamic random access memory (DRAM), synchronous DRAM (SDRAM), read-only memory (ROM), a combination thereof, or the like. In an embodiment, the memory 820 may include ROM for use at boot-up, and DRAM for program and data storage for use while executing programs. In embodiments, the memory 820 is non-transitory. In one embodiment, the memory 820 includes constructor module 821A that constructs an empirical cumulative distribution function from random samples of the population, a generator module 821B that generates a first random number that is uniformly distributed over a first interval (0,1), a finder module 821C that finds a second interval $(x_i, x_{i+1})$ in the empirical cumulative distribution function such that a range of values of the second interval covers the first random number. The generator module 821B also generates a second random number as the approximation to the first random number drawn from the population. A setting module 821D sets the second random number to an upper range of the range of values of the second interval when the random variable is discrete, sets the second random number to the minimum value of the random samples when the first random number is less than the value of empirical cumulative distribution function at the minimum value of the random samples and sets the second random number to the maximum value of the random samples when the first random number is equal to 1.

The mass storage device 830 may comprise any type of storage device configured to store data, programs, and other information and to make the data, programs, and other information accessible via the bus 870. The mass storage device 830 may comprise, for example, one or more of a solid state drive, hard disk drive, a magnetic disk drive, an optical disk drive, or the like.

The processing unit 801 also includes one or more network interfaces 850, which may comprise wired links, such as an Ethernet cable or the like, and/or wireless links to access nodes or one or more networks 880. The network interface 850 allows the processing unit 801 to communicate with remote units via the networks 880. For example, the network interface 850 may provide wireless communication via one or more transmitters/transmit antennas and one or more receivers/receive antennas. In an embodiment, the processing unit 801 is coupled to a local-area network or a wide-area network for data processing and communications with remote devices, such as other processing units, the Internet, remote storage facilities, or the like.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

In accordance with various embodiments of the present disclosure, the methods described herein may be implemented using a hardware computer system that executes software programs. Further, in a non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

According to the embodiments, the disclosed technology provides the following advantages, including, but not limited to, a novel stochastic approach to generating random numbers according to the well-constructed ECDF, the algorithm is intrinsically parallelizable and may be executed on multiple processing nodes at the same time in a distributed manner, random numbers are generated by the processing nodes in parallel and then merged together efficiently, a methodology unified by ECDF to work for both continuous and discrete random variables and an algorithm that is distribution-free with performance guaranteed by large sample analysis.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for generating random numbers that are distributed by a population distribution, comprising:
   constructing an empirical cumulative distribution function from random samples of the population;
   generating a first random number that is uniformly distributed over a first interval;
   finding a second interval in the empirical cumulative distribution function such that a range of values of the second interval cover the first random number; and
   generating a second random number as an approximation to the random number drawn from the population, wherein the second random number is employed as part of a testing process.

2. The computer-implemented method of claim 1, wherein generating the second random number comprises
   setting the second random number to an upper range of the range of values of the second interval when the random variable is discrete; and
   generating a second random number that is uniformly distributed over the second interval when the random variable is continuous.

3. The computer-implemented method of claim 2, wherein the first random number is less than 1 and greater than or equal to the value of empirical cumulative distribution function at the minimum value of the random samples.

4. The computer-implemented method of claim 1, wherein generating the second random number comprises setting the second random number to the minimum value of the random samples when the first random number is less than the value of empirical cumulative distribution function at the minimum value of the random samples.

5. The computer-implemented method of claim 1, wherein generating the second random number comprises setting the second random number to the maximum value of the random samples when the first random number is equal to 1.

6. The computer-implemented method of claim 1, further comprising collecting the random samples of the population.

7. The computer-implemented method of claim 1, wherein a plurality of second random numbers are generated by one or more processors in parallel.

8. A device for generating random numbers that are distributed by a population distribution, comprising:
   a non-transitory memory storage comprising instructions; and
   one or more processors in communication with the memory, wherein the one or more processors execute the instructions to perform operations comprising:
   constructing an empirical cumulative distribution function from random samples of the population;
   generating a first random number that is uniformly distributed over a first interval;
   finding a second interval in the empirical cumulative distribution function such that a range of values of the second interval cover the first random number; and
   generating a second random number as an approximation to the random number drawn from the population, wherein the second random number is employed as part of a testing process.

9. The device of claim 8, wherein generating the second random number causes the one or more processors to further execute the instructions to perform operations comprising:
   setting the second random number to an upper range of the range of values of the second interval when the random variable is discrete; and
   generating a second random number that is uniformly distributed over the second interval when the random variable is continuous.

10. The device of claim 9, wherein the first random number is less than 1 and greater than or equal to the value of empirical cumulative distribution function at the minimum value of the random samples.

11. The device of claim 8, wherein generating the second random number causes the one or more processors to further execute the instructions to perform operations comprising setting the second random number to the minimum value of the random samples when the first random number is less than the value of empirical cumulative distribution function at the minimum value of the random samples.

12. The device of claim 8, wherein generating the second random number causes the one or more processors to further execute the instructions to perform operations comprising setting the second random number to the maximum value of the random samples when the first random number is equal to 1.

13. The device of claim 8, wherein the one or more processors further execute the instructions to perform operations comprising collecting the random samples of the population.

14. The device of claim 8, wherein a plurality of second random numbers are generated by one or more processors in parallel.

15. A non-transitory computer-readable medium storing computer instructions for generating random numbers that are distributed by a population distribution, that when executed by one or more processors, perform the steps of:
- constructing an empirical cumulative distribution function from random samples of the population;
- generating a first random number that is uniformly distributed over a first interval;
- finding a second interval in the empirical cumulative distribution function such that a range of values of the second interval cover the first random number; and
- generating a second random number as an approximation to the random number drawn from the population, wherein the second random number is employed as part of a testing process.

16. The non-transitory computer-readable medium of claim 15, wherein generating the second random number comprises
- setting the second random number to an upper range of the range of values of the second interval when the random variable is discrete; and
- generating a second random number that is uniformly distributed over the second interval when the random variable is continuous.

17. The non-transitory computer-readable medium of claim 16, wherein the first random number is less than 1 and greater than or equal to the value of empirical cumulative distribution function at the minimum value of the random samples.

18. The non-transitory computer-readable medium of claim 15, wherein generating the second random number comprises setting the second random number to the minimum value of the random samples when the first random number is less than the value of empirical cumulative distribution function at the minimum value of the random samples.

19. The non-transitory computer-readable medium of claim 15, wherein generating the second random number comprises setting the second random number to the maximum value of the random samples when the first random number is equal to 1.

20. The non-transitory computer-readable medium of claim 15, wherein a plurality of second random numbers are generated by one or more processors in parallel.

* * * * *